United States Patent [19]

Quevedo

[11] 4,206,562
[45] Jun. 10, 1980

[54] FISH TRAP

[76] Inventor: Leonel Quevedo, 340 E. 2nd St. Hia. Apt. #3, Hialeah, Fla. 33010

[21] Appl. No.: 945,451

[22] Filed: Sep. 25, 1978

[51] Int. Cl.² .......................................... A01K 71/00
[52] U.S. Cl. ....................................................... 43/102
[58] Field of Search .................. 43/100, 101, 102, 103

[56] References Cited

U.S. PATENT DOCUMENTS

| | | | |
|---|---|---|---|
| 1,474,087 | 11/1923 | Prime | 43/100 |
| 1,670,039 | 5/1928 | Lewis | 43/100 |
| 2,716,959 | 9/1955 | Betts | 43/100 |
| 3,191,338 | 6/1965 | Burgess | 43/102 |
| 3,708,905 | 1/1973 | Talbert | 43/100 |

FOREIGN PATENT DOCUMENTS 60440 11/1912 Switzerland ................................ 43/100

Primary Examiner—Harold D. Whitehead

[57] ABSTRACT

An improved fish trap comprising an open work structure having top, bottom, and bottom side walls with an opening in one of the end walls and a guide suspended in the trap and having a mouth bounding the opening, the guide defining an upwardly converging path and having an opening confronting the bottom of the trap and being spaced from the top, bottom, and side walls within the trap.

3 Claims, 3 Drawing Figures

FISH TRAP

FIELD OF INVENTION

This invention relates to fish traps and, more particularly to an improved fish trap having a guide to guide the path of fish into the trap.

BACKGROUND OF THE INVENTION

In the past there have been numerous types of devices for use in trapping fish. This invention is of such a device which is adapted to be positioned on the bottom below a column of water to trap fish and within which bait is to be positioned and into which fish will swim to be trapped or captured.

OBJECT OF THE INVENTION

It is an object of this invention to provide an improved trap which is composed of an open work structure having top, bottom, and side and end walls, the side and end walls spanning the top and bottom panels and wherein one of the end walls has an opening and a guide is provided which bounds the opening an extends inwardly to an exit which confronts the bottom of the trap and is spaced from the top, bottom, and side walls within the trap and over which fish swim.

It is the general object of this invention to provide an improved fish trap of the type described more fully hereinafter which is simple and inexpensive to manufacture and which is well adpated for the purposes which are set forth more fully herein.

DESCRIPTION OF THE PREFERRED EMBODIMENT

Figure 1:
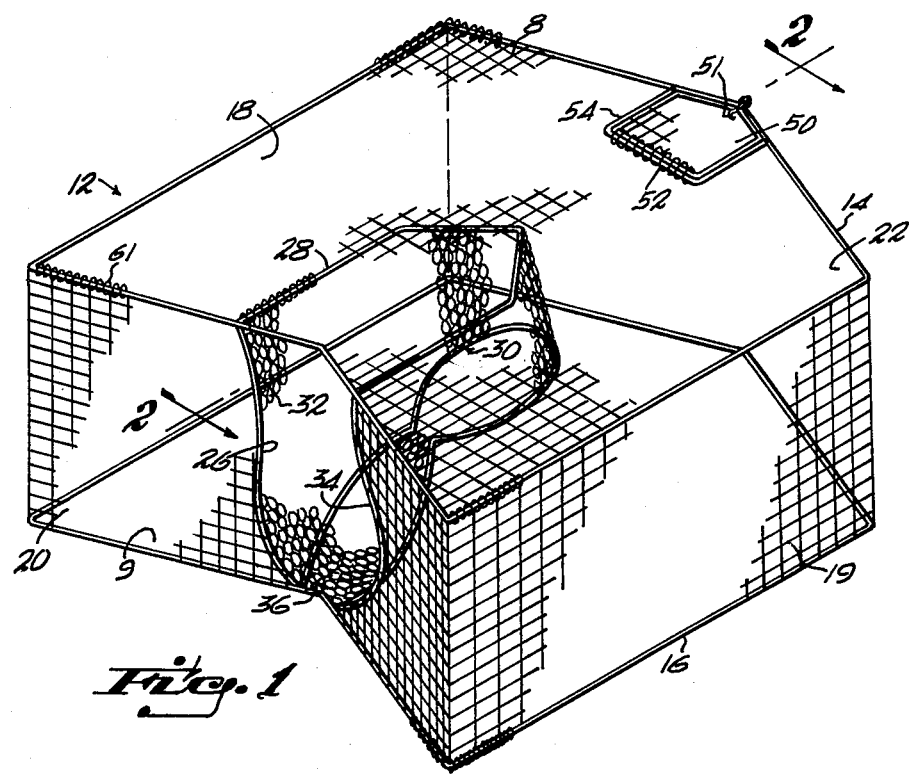
FIG. 1 is a perspective view illustrating one form of a fish trap constructed in accordance with the instant invention.

Referring to FIG. 1 there is shown a fish trap generally designated by the numeral 12 which is composed of a frame having an upper peripheral member 14 and a lower perpherial member 16 both of which are preferably similar of size and shape and wherein a wire mesh wall extends between the upper and lower frame members and defines left fish trap side 18, right fish trap side 19, and a first and second end wall 20 and 22 of the fish trap. It will be seen that in the preferred embodiment of FIG. 1 and FIG. 2 the end 20 converges inwardly and the end 22 converges outwardly. The top and bottom of the trap is also spanned by wire mesh panels 8 and 9. In the end 20 there is an opening 26 bounded by a central frame guide support member 28 from which there is suspended a guide leading from the opening to a hole 30 in the trap spaced from the top bottom and walls, within the interior of the trap. In the preferred embodiment the guideway includes a side wall 32 and 34 in opposed relation and a floor 36 which extends upwardly and which converges inwardly to the opening 30.

Figure 2:
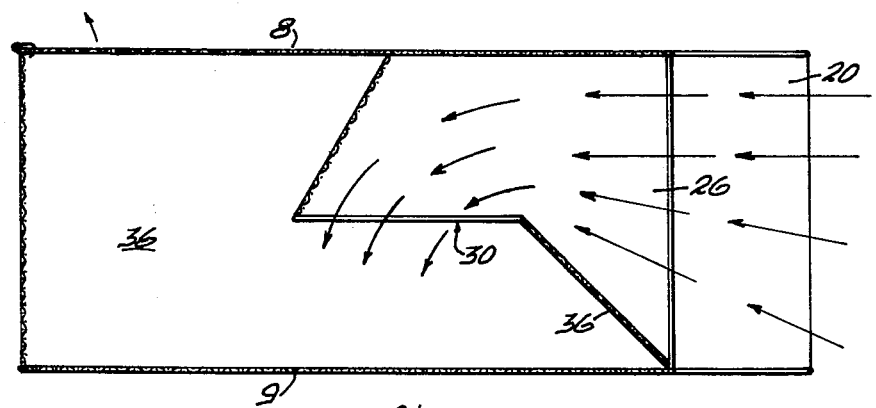
FIG. 2 is a view in cross section taken on the plane indicated by the line 2—2 of FIG. 1 and looking in the direction of the arrow.

As seen in FIG. 2, fish will be attracted to bait within the interior 36 of the trap and will swim toward the side 20 through the guide month and between it and the top and into the trap through the opening to be captured within the interior of the wire mesh. To empty fish which are trapped, a trap door is provided which is generally designated by the numeral 50. The door 50 is hingedly connected as at 52 to a door frame portion 54 welded to the top panel defining the trap door opening. The door 50 is held in position by a keeper 51.

Figure 3:
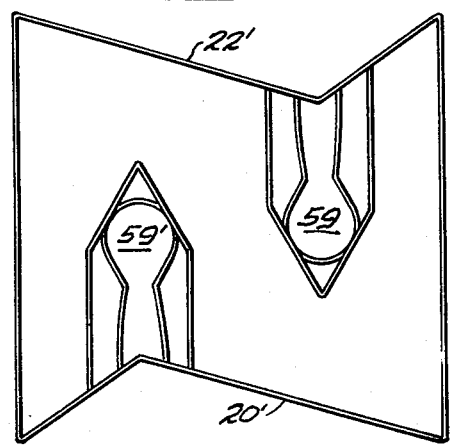
FIG. 3 is a top plan view illustrating an alternative form of the instant invention.

As shown in FIG. 3, schematically the end walls 20' and 22' may be arranged so as to converge and from each of these there is suspended a network leading to a opening 59 and 59' into which the fish swim in a manner similar to that described above.

The trap may be of any suitable size, preferably between two foot and four foot in length, width, and height and, in the embodiment shown in FIG. 3 suitable trap doors for removing the fish, similar to that described on reference to FIG. 1 are provided. The frame may be made of one-quarter inch rod and the mesh is generally of about 2×1 inch galvanized steel or mesh. The galvanized steel is attached to the frame by a winding designated by the numeral 61 which may be of galvanized steel wire. The guide leading to the opening through which the fish pass to be trapped is bounded by a network of 16 gauge galvanized steel wire in the form of circular elements which are connected together and commercially available or, the same, alternatively may be made of what is commercially known as chicken wire. In the preferred embodiment it is of 16 gauge galvanized steel wire and suspended from a 10 gauge galvanized steel frame.

What is claimed is:

1. A fish trap comprising an open work structure having a top, bottom, and opposing pairs of side and end walls in generally perpendicular relation with respect to the top and bottom, with an opening in one of the end walls, and a first guide suspended in the trap and said guide having a mouth bounding the opening, said guide defining an upwardly converging path beneath the top and including a ramp surface and spaced guide walls along the ramp and interconnecting the ramp and trap top, said ramp and guide walls comprising interconnected loops of wire and said ramp terminating at an opening in the guide bounded by said guide walls, said opening being generally in a horizontal plane and confronting the bottom of the trap, said opening being spaced from the top, bottom and side walls within the trap; said openwork structure of said trap being composed of wire mesh material; said trap including a peripheral rod frame; and said trap including a trap door including keeper means for maintaining the trap door in a normal closed position.

2. The device as set forth in claim 1 wherein the other of said pair of end walls includes a second guide suspended in the trap and said second guide having a mouth bounding the opening, said second guide defining an upwardly converging path beneath the top and including a ramp surface and spaced guide walls along the ramp, said ramp surface and second guide walls comprising interconnected loops of wire and said second guide walls interconnecting the ramp and top of said trap, said ramp of said second guide terminating at an opening in the guide bounded by said second guide walls, said opening being generally in a horizontal plane and confronting the bottom of the trap, and said opening confronting the bottom of the trap and being spaced from the top, bottom and side walls within the trap.

3. The device as set forth in claim 1 wherein said end wall converges toward said opening.

* * * * *